March 17, 1931.  E. H. REIF  1,797,021

PROCESS OF PACKING HONEY

Filed Sept. 22, 1928

Witnesses:
K. W. Fischer
F. C. Appleton

Inventor:
Ervin H. Reif
By Joshua R. H. Cook
His Attorney.

Patented Mar. 17, 1931

1,797,021

UNITED STATES PATENT OFFICE

ERVIN H. REIF, OF KALONA, IOWA

PROCESS OF PACKING HONEY

Application filed September 22, 1928. Serial No. 307,753.

This invention relates to a process of packing and wrapping comb honey and an object of the invention is the provision of a new and improved process for preparing comb honey in merchantable form which consists in cutting already prepared honey combs into blocks or squares of the desired shape or weight, then sealing the severed cells resulting from the cutting operation by an appropriate sealing agency, and then enclosing the article in a suitable container for marketing or shipping.

In the production of comb honey it has heretofore been the practice to use wooden frames of a comparatively small size, and the comb honey produced is handled and marketed in the original frames. The usual frame employed for this purpose is approximately 4″ square and this size has been adopted inasmuch as the comb honey produced in the frame weighs in the neighborhood of a pound. The process employed in the present invention represents a distinct departure from the aforementioned method in that the comb honey is preferably produced in relatively large blocks or squares. This is of considerable advantage from the beekeepers' standpoint by reason of the fact that bees will produce more honey when not restricted to a small area of production. It has furthermore been customary when preparing comb honey for the market otherwise than in the individual frames above referred to, to prepare the honey to be contained in bottles or jars and an important object of the present invention is the substitution of comb honey in its original form as a marketable article, thus preserving the original flavor and richness which are sacrificed to some extent when the honey is reduced to a fluid state.

Other objects will appear hereinafter.

The invention consists in the combinations and arrangements of parts hereinafter described and claimed.

The invention will be best understood by reference to the accompanying drawings forming a part of this specification, and in which.

Figure 1:
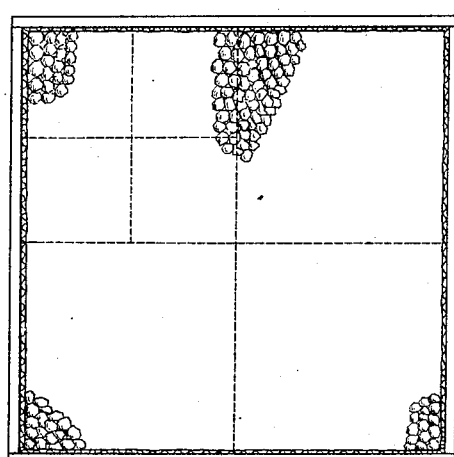
Fig. 1 is a plan view of an embodiment of the present process with a view of the honey comb cells indicated in the figure.
Figure 2:
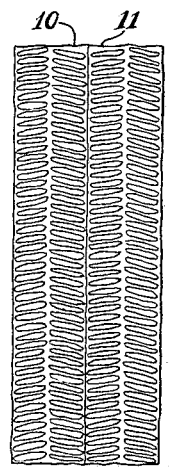
Fig. 2 is a plan view of the two adjoining edges of a block of comb honey following the severing operation.
Figure 3:
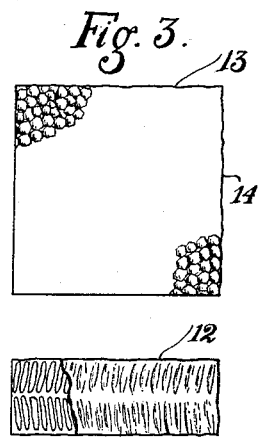
Fig. 3 is a plan view of one of the severed blocks of honey resulting from the practice of the present invention.
Figure 4:
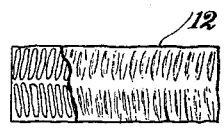
Fig. 4 is an edge view of a severed block of honey indicating the application of the sealing agency with a portion broken away to indicate the original severed cells.
Figure 5:
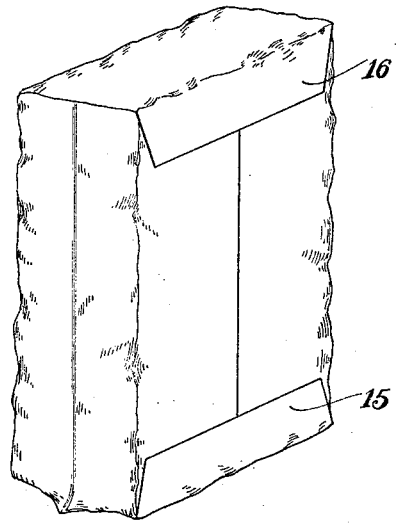
Fig. 5 is a perspective view of a block of honey as prepared in accordance with the present invention after insertion and wrapping in a suitable container.

As illustrated in the drawings, the preferred embodiment of the invention incorporates the provision of a comparatively large frame within which the bees work and produce the honey, designated by the numeral 9. The frame 9 is lined in the usual manner to instigate production of honey by the bees and the present process is employed after a complete frame has been filled with comb honey. Subsequent to this production of the comb honey by the bees a comparatively large block of honey is cut into the desired sizes. Fig. 2 indicates the appearance of two adjacent edges following the severing operation, and in order to prepare the separated blocks for packing and shipping, a step in the process of the present invention resides in coating and covering the edge of the individual block of honey with a suitable sealing agency which in the preferred embodiment of the invention consists of melted beeswax. Thus, two adjacent edges 10 and 11 are coated with a sealing material to present the appearance shown at 12 in Fig. 4, and this operation is performed immediately following the severance of the block in order to prevent loss of the liquid honey from the severed cells. As will be noted in Fig. 3, the sides 13 and 14 indicate lines of severance but a slight irregularity in the lines of cutting is immaterial and unavoidable inasmuch as an important object is to produce the comb honey in individual blocks of any desired or selected size or weight. Following the cutting and sealing operations as above described, each individual block of honey is preferably inserted in a suitable wrapper for merchandising purposes and it has been found materially advantageous to use a transparent paper container so that the comb honey in its original form may be visible to the purchaser. In carrying out the process fenestra or glassine paper sacks are very suitable in the final wrapping and packing operations, and as shown in Fig. 5, the original seal 15 of the sack remains intact and following the insertion of the separated block of comb honey, the open end of the sack is folded over as indicated at 16 and may be sealed with paraffin or any equivalent preparation.

Figure 6:
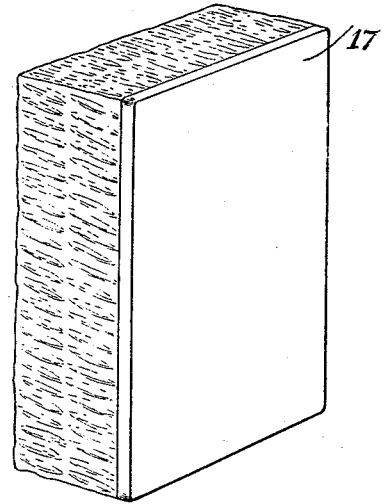
Fig. 6 is a perspective view of a block of honey prepared by the present process mounted upon a wooden base for shipping purposes.

In the preparing blocks of honey for shipping in accordance with the present invention it is generally advisable to provide a supporting or reinforcing member and for this purpose a piece of wood 17, as shown in Fig. 6, is readily adaptable and may be sealed or connected to a block of honey during the cell sealing operation above described. Further, Fig. 6 indicates the appearance of one of the individual blocks when finally prepared and ready for packing.

It will thus be seen that by the present invention it is possible to prepare for selling or shipping comb honey in any desirable size, and by employing dust-proof and/or airtight packages with the advantageous object of preserving the honey with its original freshness and flavor. Melted beeswax has been found a very suitable medium for sealing the edges of the cut blocks inasmuch as it is edible and hardens very rapidly, generally in about two seconds after application.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. The process of wrapping honey which consists in cutting individual blocks of comb honey from a larger block, applying a supporting base to the individual block, so cut, and then sealing the severed cells resulting from the cutting operation to produce individual blocks of comb honey in merchantable form, and wrapping the article in a dust-proof container.

2. The process of wrapping honey which consists in cutting individual blocks of comb honey from a larger block, applying a supporting base to the individual block so cut, and then sealing the severed cells resulting from the cutting operation to produce individual blocks of comb honey in merchantable form, and wrapping the article in a transparent paper dust-proof container.

In testimony whereof I have signed my name to this specification.

ERVIN H. REIF.